US011886647B2

United States Patent
Wu et al.

(10) Patent No.: US 11,886,647 B2
(45) Date of Patent: Jan. 30, 2024

(54) IN-AIR GESTURE CONTROL METHOD BASED ON VISIBLE LIGHT SIGNALS

(71) Applicant: SHANGHAI JIAOTONG UNIVERSITY, Shanghai (CN)

(72) Inventors: Fan Wu, Shanghai (CN); Zimo Liao, Shanghai (CN); Guihai Chen, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 2 days.

(21) Appl. No.: 17/949,951

(22) Filed: Sep. 21, 2022

(65) Prior Publication Data

US 2023/0096340 A1    Mar. 30, 2023

(51) Int. Cl.
*G06F 3/01* (2006.01)
*G06F 18/2413* (2023.01)
*G06F 3/03* (2006.01)

(52) U.S. Cl.
CPC ............ *G06F 3/017* (2013.01); *G06F 3/0325* (2013.01); *G06F 18/24147* (2023.01)

(58) Field of Classification Search
None
See application file for complete search history.

(56) References Cited

U.S. PATENT DOCUMENTS

| 2019/0033976 A1* | 1/2019 | Cao ......................... G06V 40/28 |
| 2023/0025945 A1* | 1/2023 | He .......................... G06F 3/0416 |
| 2023/0135048 A1* | 5/2023 | Sun ......................... G06V 40/28 |
| | | 715/863 |

\* cited by examiner

*Primary Examiner* — Amare Mengistu
*Assistant Examiner* — Sarvesh J Nadkarni
(74) *Attorney, Agent, or Firm* — CBM PATENT CONSULTING, LLC (57) ABSTRACT

An in-air gesture control method based on visible light signals, which transmits light signals through a display device and collects its light signals reflected by hand, and after analysis, realizes gesture recognition; the transmitted light signals are in the visible light band; which can realize the gesture recognition and control on mobile devices without modifying hardware and a visible light-based gesture recognition system on commercial mobile devices; compared with the existing gesture recognition methods on commercial mobile devices, the invention avoids special hardware modification, that is, it does not require any additional components on the mobile device, such as a depth camera, and protects the user's privacy well.

9 Claims, 7 Drawing Sheets

IN-AIR GESTURE CONTROL METHOD BASED ON VISIBLE LIGHT SIGNALS

CROSS REFERENCES

This application claims priority to Chinese Patent Application Ser. No. CN202111126580.5 filed on 26 Sep. 2021.

FIELD OF TECHNOLOGY

The present invention relates to a technology in the field of mobile sensing. Particularly, it is a method for in-air gesture recognition based on visible light signals.

BACKGROUND OF TECHNOLOGY

In-air gesture control is a natural way to interact with devices. It extends the traditional touch-based interaction method. Existing works implement in-air gesture control via hardware on commercial devices like cameras, microphones, and Wi-Fi radios. However, these methods have not been commercialized on mobile devices. Solutions based on cameras and microphones raise privacy concerns. Wi-Fi-based solutions are sensitive to background noise and most of them require specialized hardware. Several flagship smartphones are equipped with specialized hardware to support in-air gesture recognition (e.g., google Pixel 4, LG Q8 ThinQ). However, they all rely on extra hardware on the mobile device.

DESCRIPTION OF INVENTION

The invention proposes an in-air gesture control method based on visible light signals, which can realize in-air gesture recognition on commodity mobile devices without adding hardware.

The invention is achieved through the following technical solutions:

The invention relates to a kind of gesture recognition methodology based on visible light signals. The light signal is emitted from the display device, then reflected by hand gesture and finally collected and analyzed to realize gesture recognition, wherein the emitted light signal is in the visible light band.

The emitted light signal is preferably to generate spatially resolved information beyond the perception range of the human eye in a line-by-line refresh mode.

The spatial resolution information is preferably embedded in the current display content to keep the user's viewing experience.

The analysis includes, after preprocessing and segmenting the reflected signal, respectively selecting and extracting gesture features, and finally obtaining gestures by classification.

The invention relates to a system that realizes aforesaid methodology, includes, frame processing unit (at transmitter), signal processing unit (at receiver) and gesture recognition unit, wherein: frame processing unit processes the original frame into a pair of multi-line complementary frames, so that the visual effect of switching the complementary frames is the same as the original frame and the complementary frames can generate a frequency that breaks the limit of the screen refresh rate. The signal processing unit preprocesses the light intensity signal collected by the light sensor and calculates energy sequences of several key frequencies. The gesture recognition unit extracts features from energy sequences generated by the signal processing unit and classifies the gesture using k-NearestNeighbor(kNN) model.

Technical Effect

In the invention, multi-line complementary frames are switched at transmitter, and the brightness for adjacent lines of the complementary frames is opposite. The line-by-line refresh mechanism is used to break the limitation of the screen refresh rate and generate high frequency light signals. At transmitter, unobstrusive light signals are transmitted to provide sufficient spatial resolution information. The light signals are hided in the screen content to avoid changing the user's viewing experience. The user's gestures are recognized according to the low-quality light intensity data collected by the built-in ambient light sensor on mobile devices. The display device and the ambient light sensor which are commonly deployed on mobile devices are separately used as the transmitter and receiver of the light signals to realize visible light based gesture recognition.

DETAILED DESCRIPTION OF INVENTION

This embodiment relates to a gesture control methodology based on visible light signals.

The light signals are transmitted through the display device, and the signals reflected by hand gestures are collected by the light sensor. The reflected signals are analyzed to realize gesture recognition.

Figure 1:
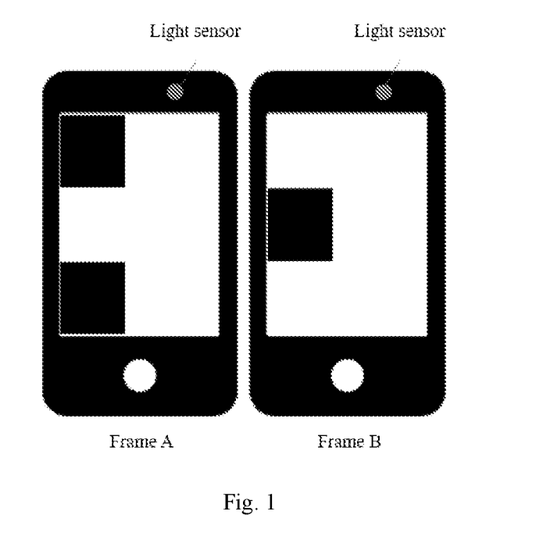
FIG. 1 illustrates the position of complementary blocks on the display device in disclosed embodiments.

The light signals are generated by switching two adjacent complementary frames on the display device. The unobtrusive spatial resolution information is generated by a line-by-line refresh scheme, as shown in FIG. 1: when two complementary frames with n lines are switched continuously, the display device can generate a light signal with frequency $$\frac{n * f_s}{2},$$

where: $f_s$ represents the refresh rate of the display device. Then the light signals transmitted by the display device have two frequency components:

$$\frac{n*f_s}{2} \text{ Hz and } \frac{f_s}{2} \text{ Hz.}$$

The complementary blocks are on the left side of the light sensor. In order to hide the complementary blocks into the display content, the pixels that need to be modified in the original frame (i.e., the complementary block) need to be converted one by one from the RGB color space to CIE 1931 XYZ color space, and then decomposed into two complementary pixel values to gain two complementary frames.

In this embodiment, n=3.

The color space conversion from RGB color space to CIE 1931 XYZ color space is: x=0.41R+0.36G+0.18B, Y=0.21R+0.72G+0.07B, Z=0.02R+0.12G+0.95B, wherein: X,Y,Z represents three dimensions of the XYZ color space separately, and R, G, B represents three dimensions of the RGB color space separately.

Further, XYZ color space is converted into chromaticity and luminance:

$$x = \frac{X}{X+Y+Z}, y = \frac{Y}{X+Y+Z}, Y = Y,$$

where: (x, y) represents chromaticity, and Y represents luminance.

The original frame is decomposed into two complementary frames by converting the color value (R, G, B) of an original pixel into (x, y, Y), and calculate color values of a pair of complementary pixels $(x_1, y_1, Y_1), (x_2, y_2, Y_2)$. The problem is formulated as a linear optimization problem:

$$\max \Delta Y = |Y_1 - Y_2|$$
$$\text{s.t. } x_1 = x_2 = x, y_1 = y_2 = y, Y = \frac{Y_1 + Y_3}{2}.$$

Figure 2:
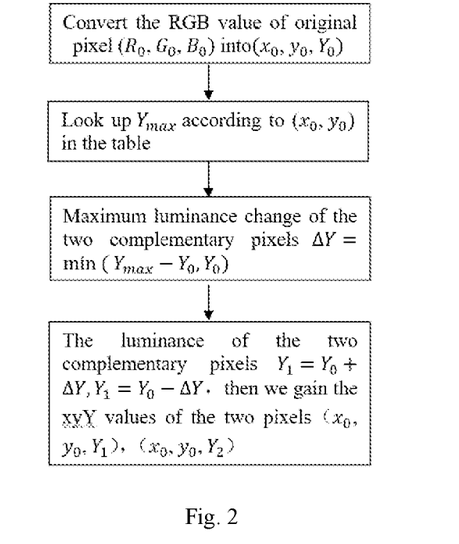
FIG. 2 is a flow chart for calculating the pixel values of complementary frames in disclosed embodiments.

Referring to FIG. 2, the computing overhead is reduced by storing results in a lookup table, so that $Y_{max}$ can be directly found according to (x, y), and then the calculation of the optimization problem can be continued.

Figure 3:
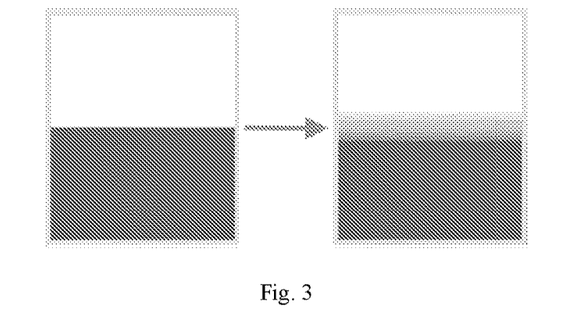
FIG. 3 illustrates the scattering scheme of complementary blocks' edges in disclosed embodiments.
Figure 4:
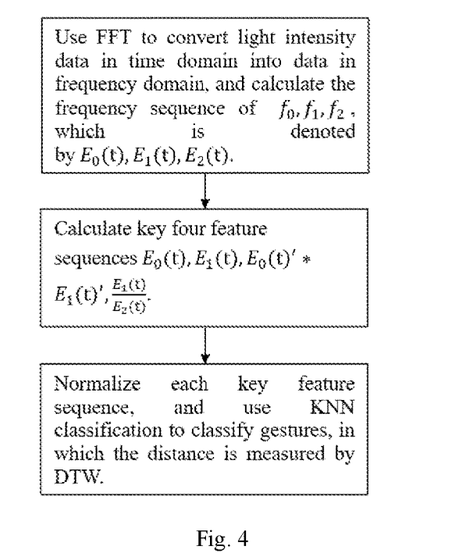
FIG. 4 is a flow chart for processing light intensity data and classifying gestures in disclosed embodiment.
Figure 5:
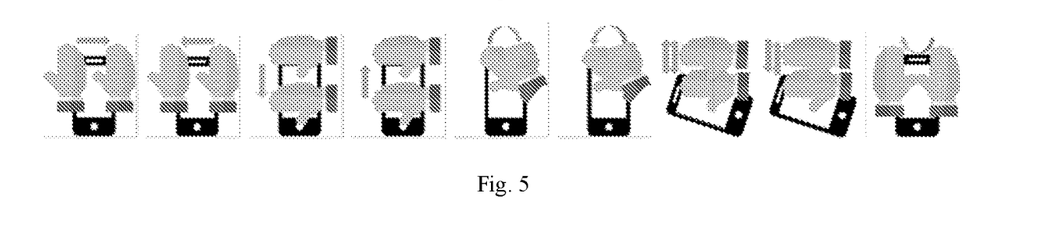
FIG. 5 illustrates gestures tested in disclosed embodiment.

Referring to FIG. 3, by adding an edge smoothing mechanism, the edges of the complementary blocks are scattered to reduce the influence of the visual effect.

The reflected signals in this embodiment is collected by the ambient light sensor TEMT6000 with a sampling rate of 250 Hz.

In this embodiment, after preprocessing and segmenting the reflected signal, the gesture features are selected and extracted, and finally the gestures are recognized, including:

(1) Preprocess the reflected signals with short-time Fourier transform to convert the data from time domain into frequency domain, wherein the amplitude sequences of $$f_0 = 0 \text{ Hz}, f_1 = \frac{f_s}{2} \text{ Hz and } f_2 = \frac{n*f_s}{2} \text{ Hz}$$

are valid feature sequences. In this embodiment, n=3.

(2) Segment the $$\frac{f_s}{2} \text{ Hz}$$

amplitude sequence in frequency domain. When the amplitude is larger than a threshold, it means that a gesture is generated, and then the feature sequences are analyzed and finally the gesture is recognized; Otherwise, the analysis of feature sequences is skipped and gesture recognition is not required.

(3) After analyzing the feature sequences, use the kNN classification method to classify gesture, specifically: choose the amplitude sequence $E_c(t)$ corresponding to $f_G$=0 Hz, the amplitude sequence $E_1(t)$ corresponding to $$f_2 = \frac{f_s}{2} \text{ Hz,}$$

the product of the first derivative $E_0(t)'*E_1(t)'$, and the ratio of $E_1$ to $E_2(t)$ ($E_2(t)$ is the amplitude sequence of $$\frac{3*f_s}{2} \text{ Hz}), \frac{E_1(t)}{E_2(t)},$$

as four key feature sequences. Each feature sequence is normalized with z-score normalization, and the distance is calculated with dynamic timing warping.

The embodiment is implemented on a commercial off-the-shelf tablet, i.e., iPad Pro with an 11-inch screen. As the operating system restrains the operation access to the screen driver, pre-processed videos are used to emulate the switching between complementary frames. The blinking blocks are positioned on the right side of the screen. The width of the blinking zone is about 5 cm, which can fit onto the screens of the majority of mobile phones. Thus, the embodiment can not only be implemented on tablets, but also on smartphones. By default, the brightness of the screen is 100% and the screen displays a coffee shop picture.

A standalone ambient light sensor (i.e., TEMT6000) is used as the receiver. The distance between the light sensor and the blocks' left edge is 2.5 cm. The default sampling rate of ALS is set to 250 Hz, since the integration time of most ALSs are below 4 ms [2, 12, 13]. Users perform gestures at approximately 10 cm above the screen.

The embodiment is tested in 5 environments with 8 users (5 males and 3 females) in the age range of 20 to 30. Experiments are conducted in five typical environments. Table below summarizes the experiment settings:

TABLE 1

| Item | Number | Value |
| --- | --- | --- |
| User | 8 | 5 males, 3 females |
| Gesture | 9 | LeftRight, RightLeft, TopBottom, BottomTop, Fist, Openhand, UpDown, DownUp, Flip |
| Environment | 5 | 0 lux, 150 lux, 350 lux, 700 lux, 2000 lux |

Recognition Accuracy: The classification accuracy of the embodiment with different design choices and different environment settings. Ask eight users to perform each gesture 20 times. Besides, to investigate the robustness for various environments, one user is asked to perform each gesture 50 times in each environment. By default, the average of 10-fold cross-validation is used as the final result.

Figure 6:
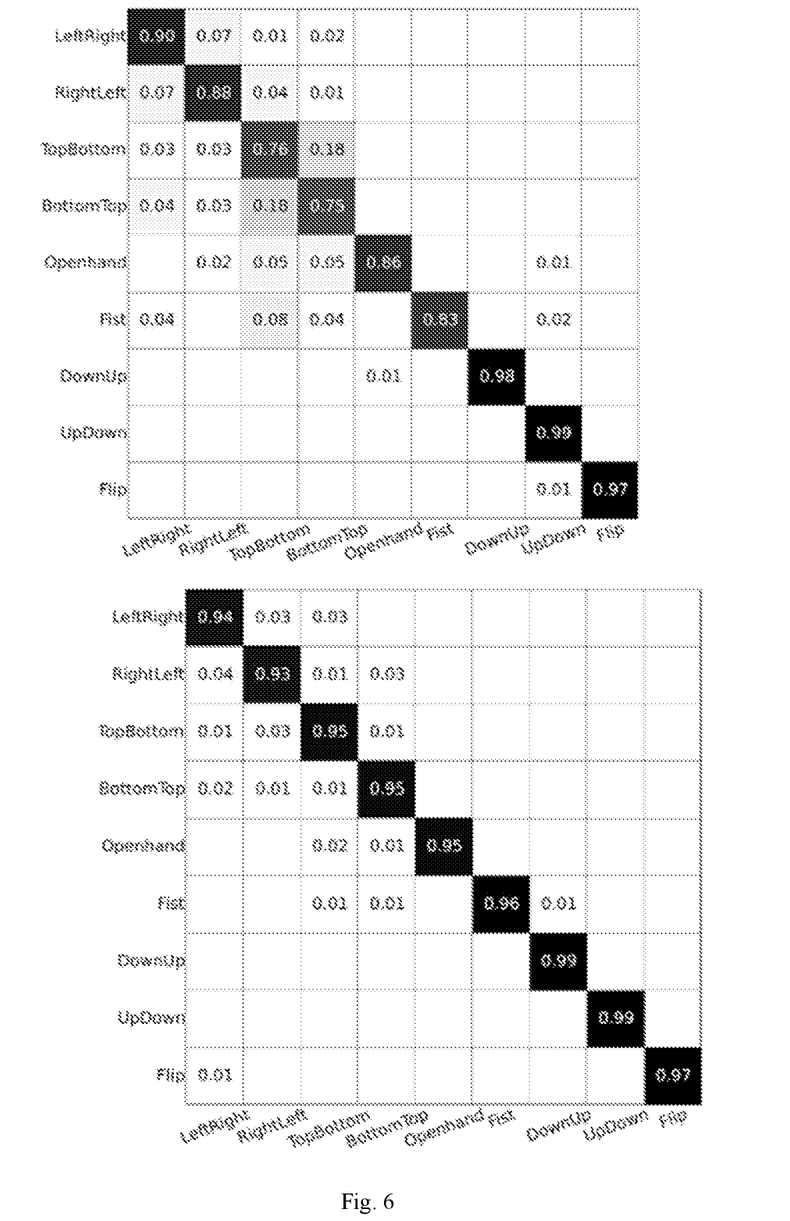
FIG. 6 is two confusion matrices of the recognition frames trained with two different feature sets in disclosed embodiment.

Different Feature Sets. In order to show the effectiveness of the key features, the recognition accuracies trained with different sets of features are compared. Feature set 1 only includes the time series of $E_0$, $E_1$ and $E_2$, which are the power of DC, $f_1$ and $f_2$ respectively. Feature set 2 contains the four key features. FIG. 6 illustrates the confusion matrices of the recognition framework trained with the two feature sets, separately. It is observed that feature set 2 achieves 96.1% accuracy compared to that of 87.3% for the feature set 1. Especially, for the four gestures "TopBottom", "BottomTop", "Openhand" and "Fist", the accuracy is improved from 79.6% to 95.3% with the two carefully designed features, i.e., $R_{12}$ and $E_0(t)'*E_1(t)'$.

Different Lighting Environments: Test 5 static environments that correspond to common lighting conditions: (1) A completely dark room, where the light intensity is 0 lux. (2) A conference room with the lighting infrastructure on at night. The average light intensity is about 150 lux. (3) A lounge environment in the day time, where the average light intensity in the room is about 350 lux. (4) A normal office in the day time with sunlight and lighting infrastructure. The average light intensity is about 700 lux. (5) A bright corridor besides a window in the afternoon. The average light intensity is about 2000 lux.

To examine the influence of light fluctuations on recognition accuracy, two common dynamic light environments are tested: (1) Human interference: Ask one subject to perform the nine gestures and another subject is commanded to walk around the place. Each type of gesture is tested for 20 times in 4 light environments (except for the 700 lux normal office, since there is no space around the testbed to allow a subject to walk around). (2) Global light intensity variation: Conduct the experiment in the office with multiple light sources. A user performs each gesture 20 times, while one lamp, on the same desk as the testbed, is switched on/off every 3 s. The ALS measures the light intensity changes between 600 lux and 750 lux.

Figure 7:
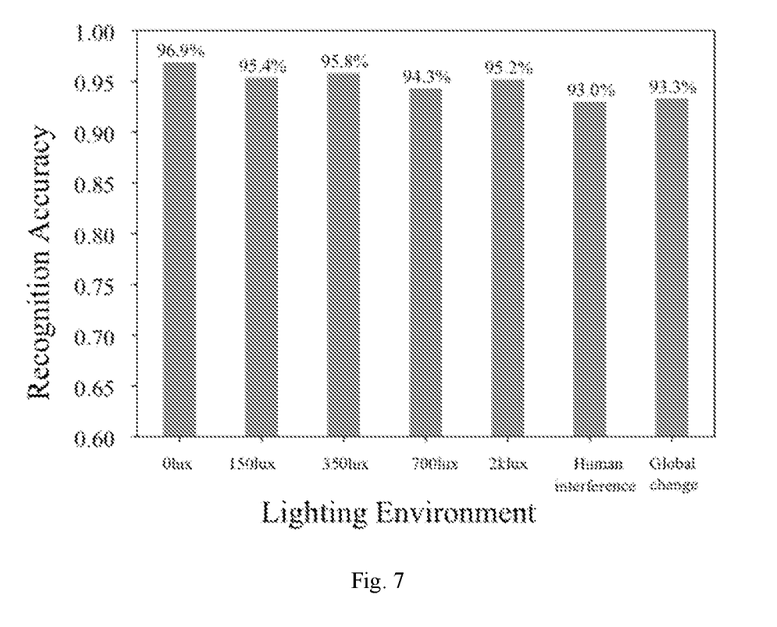
FIG. 7 illustrates disclosed embodiment effect.

FIG. 7 presents the recognition accuracy under the different light conditions. It is observed that 1) the recognition accuracies under the static environments range from 94.3% to 96.9%, which means that the system works well under static environments. 2) the accuracies in the two dynamic light environments are above 93%. Thus, the system is able to work at various ambient light intensities, from a dark (0 lux) to a bright (2000 lux) indoor environment, and is robust under dynamic changing light conditions.

Figure 8:
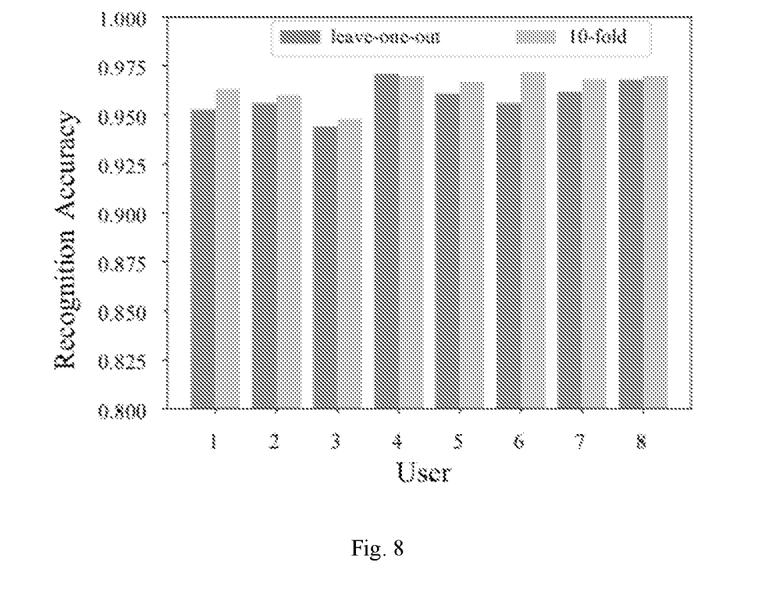
FIG. 8 illustrates disclosed embodiment effect.

User diversity: To investigate the robustness of the method for unseen users, both leave-one-out and 10-fold cross validation are used to evaluate the accuracy of each user. With leave-one-out, the test user's samples are excluded from the training set. The results are shown in FIG. 8.

The leave-one-out and 10-fold cross validation results of each user are similar, which means that the method is a generic rather than a personalized model. This is because although the gesture amplitude and velocity are diverse for different users, normalization techniques (Z-score and dynamic time warping) are applied to cancel out the interference of personal habits and focus on the features that are related to hand gestures.

Figure 9:
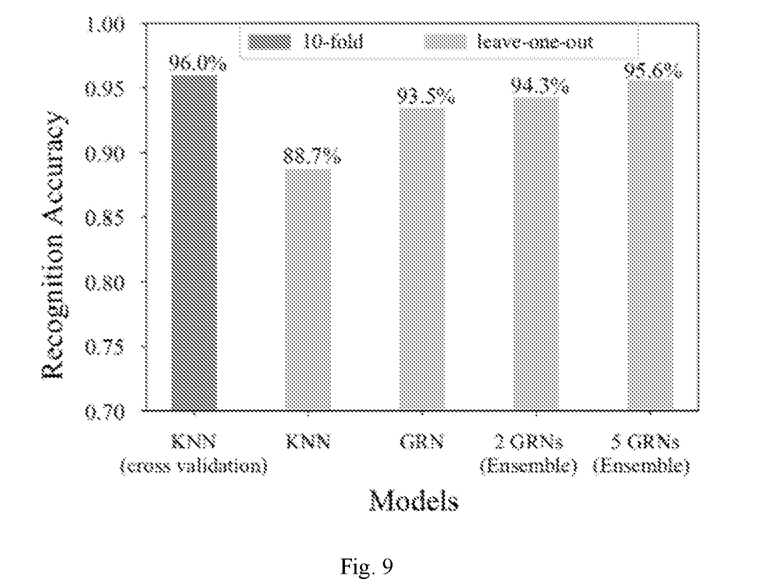
FIG. 9 illustrates disclosed embodiment effect.

Unseen Scenarios: Considering the performance for unseen environments, leave-one-out cross validation is used. As shown in FIG. 9, 96% accuracy is achieved with kNN if tested environment's samples are included in the training set, while 88.7% accuracy is achieved for unseen environments.

To improve the performance of unseen scenarios, the KNN classifier is replaced with a gated recurrent neural network (GRN) to achieve better performance. This model is built with two bi-directional gate recurrent layers with dropout for feature extraction and one fully connected layer for classification. Experiments show that it achieves 93.45% average accuracy on "unseen" environments. Besides, the performance of GRN can be improved with model ensemble, which jointly considers the output of multiple models and determines the final label. Usually, model ensemble can promote accuracy at the price of more computation and storage consumption. Experiments demonstrate that the ensemble of 2 GRNs and 5 GRNs achieve 94.27% and 95.61% average accuracy on "unseen" scenarios, respectively. The results of different models' accuracies are shown in FIG. 9.

Figure 10:
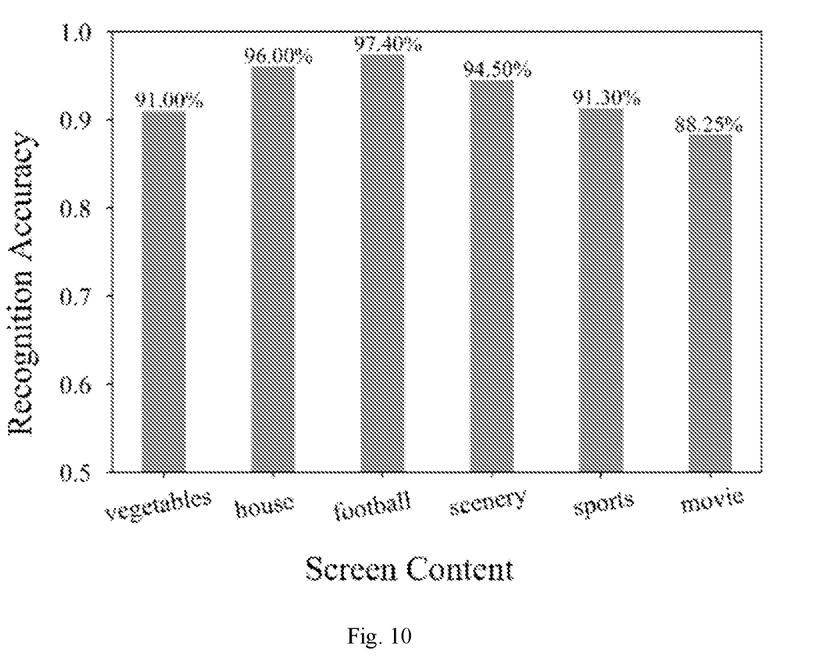
FIG. 10 illustrates disclosed embodiment effect.
Figure 11:
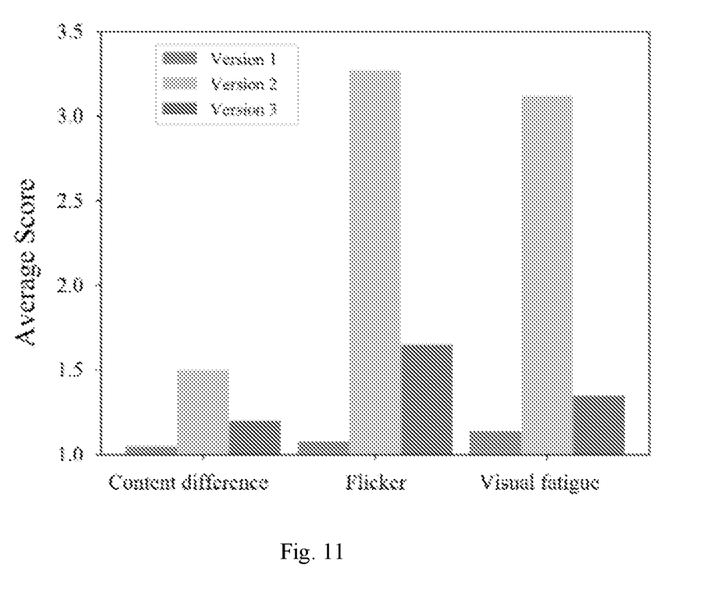
FIG. 11 illustrates disclosed embodiment effect.

Different Screen Contents: (1) Static contents: The gesture recognition accuracy is tested with 3 different static contents (vegetables, coffee shop and football field). The three contents separately corresponds to three levels of average $\Delta Y$: (20, 40), (40, 60), (60, 80). As shown in FIG. 10, it is observed that with a larger $\Delta Y$, the recognition accuracy becomes higher. It is easy to understand since a larger $\Delta Y$ means higher SNR of light signals from the screen, leading to more distinguishable features. (2) Dynamic contents: Besides, the gesture recognition accuracy is tested with 3 types of dynamic contents including scenery video, sports, and movies. They respectively represent videos with minor, medium, and drastic frame transition. For each video type, 3 video clips are chosen, each about 30-90 s. During the test for each video clip, the video clip is played on a loop and the subjects perform each gesture 10 times at random moments. As shown in FIG. 10, the gesture recognition accuracy of the method is acceptable when the screen is displaying dynamic content. Although the dynamic content changes the light intensity, for the majority of time, it changes smoothly and slowly. Furthermore, the duration of a gesture is usually short (around 1-2 s) and screen light will not change significantly within such a short interval. Thus, hand gestures play a the dominant role in the received light intensity.

Frame processing latency: To evaluate the ability to support real-time display, the frame processing algorithm is displayed on both the Android and iOS platform. The algorithm is run on 5 Android devices (Xiaomi MI9 Pro, Samsung A90, Samsung Galaxy S10, ZTE AXON10Pro), and 2 iOS devices (iPhone 11Pro, iPhone XS) and measure the processing time for each frame. 10 1080p images and 2 videos are tested on different devices. Each image/video is tested on each device 10 times.

Figure 12:
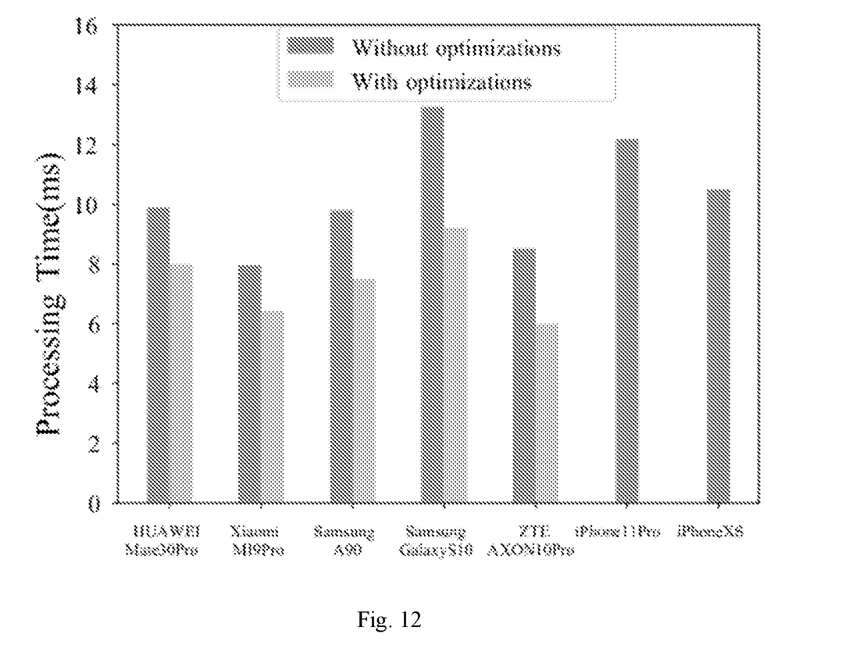
FIG. 12 illustrates disclosed embodiment effect.

Some simple optimizations are performed to reduce the computation load, including both the spatial domain and the time domain: (1) Spatial domain: if a block in the frame is of single color (same RGB values), the system does the processing only once; (2) Time domain: if pixels in a frame share the same color with the previous frame, the system reuses the results from the previous frame. The average result of the processing time for each device is calculated and shown in FIG. 12. It is observed that the average processing time of different devices is 6-9 ms after optimizations. Thus, it is possible for each frame to be processed and rendered in real time to support 60 FPS dynamic displaying.

Comparison with depth camera: The gesture recognition of Huawei Mate 30 Pro is tested, which has a gesture sensor (i.e. a depth camera) on the front panel. As Huawei Mate 30 Pro supports 6 gestures (i.e., "LeftRight", "RightLeft", "TopBottom", "BottomTop", "UpDown", "Fist"), each gesture is tested for 30 times in a static light environment. The average accuracy is 93.8%. The average accuracy for recognizing 9 gestures is 93.0%-96.9%. Thus, the system has comparable accuracy with the commercial system.

Power consumption: To evaluate the power consumption, the system is run on Huawei Mate 30 Pro. The power consumption comes from two parts: (1) Transmitter: It mainly refers to the power consumption for frame processing. The power consumption for screen display is not included in the measurement, as the screen is always on when the smartphone is in use, whether it is running or not. (2) receiver: It mainly refers to the the power consumption for running the gesture recognition algorithm. Similar to screen, ALS is always on when the smartphone is in use, and thus the power consumption of ALS is not included in the measurement.

5 types of display content are tested: online chatting, web browsing, online shopping, playing scenery videos and watching movies. Besides, a control group is set(without running the algorithm, but with the screen and ALS on). By looking at the difference between the experimental group and the control group, the power consumption can be measured.

Figure 13:
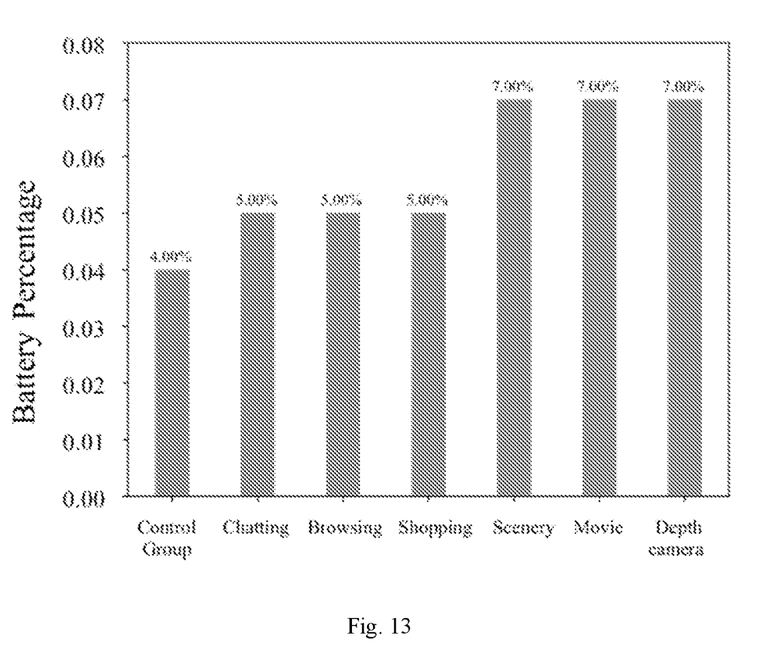
FIG. 13 illustrates disclosed embodiment effect.

For Huawei Mate30 Pro, BatteryManager.BATTERY_PROPERTY_CAPACITY is used for reading the battery percentage. In order for the results to be accurate, the system runs for 1.5 hours for each test. Each case is repeated 3 times. The average battery drop of each type of scene is shown in FIG. 13. To measure the power consumption of depth-camera, the API function CameraManager.open( ) is used to keep the depth-camera on for 1.5 hours and examine the battery drain of the mobile phone. The experiment is repeated 3 times and the battery drop is 7%.

Comparing the power consumption of this system and depth-camera, there are two observations. First, the power consumption of the system is lower than depth-camera in most cases. It mostly benefits from the time domain optimization, as a large portion of pixels in subsequent frames share a lot of similarity. Second, the power consumption for more drastic frame transition is higher. The reason is that drastic transition leads to more different pixels between the adjacent frames, which means more pixels in the new frames need to be processed. Jointly considering accuracy and power consumption, the system has comparable gesture recognition performance with depth camera but lower power consumption.

To sum up, the present invention utilizes the display device and the ambient light sensor on the mobile device as the transmitter and the receiver of the light signals to realize a visible light-based gesture recognition system on commercial devices. Compared with the existing gesture recognition methods on commercial devices, the method avoids specialized hardware modification. That is, it does not require any additional components deployed on the mobile device, such as a depth camera, and protects the user's privacy. Besides, the invention is compared with the depth camera to verify its energy consumption advantage.

The above-mentioned specific implementation can be partially adjusted by those skilled in the art in different ways without departing from the principle and purpose of the present invention. The protection scope of the present invention is based on the claims and is not determined by the above limited by the implementation, each implementation scheme within its scope is bound by the present invention.

What is claimed is:

1. An in-air gesture control method based on visible light signals
comprising a light signal is emitted through a display device and its reflection signal with gestures is collected, and after analysis, gesture recognition is realized and used to generate corresponding control instructions, wherein: emitted light signals are in visible light bands;
a spatial resolution information in the display device to reduce user's visual effect;
wherein the analysis comprises the following steps:
  i) performing short-time Fourier transform on reflected signals to convert data in time domain into frequency domain, amplitude sequence of $f_0=0$ Hz, $f_1=$ $$\frac{f_s}{2} \text{ Hz},$$

and $$f_2 = \frac{n*f_s}{2} \text{ Hz}$$

are effective features;
  ii) segmenting the sequence of $$\frac{f_s}{2} \text{ Hz}$$

amplitudes in the frequency domain; when the amplitude of the frequency light signal is greater than the threshold, a gesture is detected, then the feature sequence needs to be processed and gesture recognition is performed; otherwise, the feature sequence is skipped and gesture recognition is not required; and
  iii) after selecting the feature sequence, K-nearest neighbor classification method is used to classify and realize gesture recognition, specifically: choose the amplitude sequence $E_0(t)$ corresponding to $f_0=0$ Hz, the amplitude sequence $E_1(t)$ corresponding to $$f_1 = \frac{f_s}{2} \text{ Hz},$$

the product of the first derivative $E_0(t)'*E_1(t)'$, and the ratio of $E_1$ to $E_2(t)(E_2(t)$ is the amplitude sequence of $$\frac{3*f_s}{2} \text{ Hz}), \frac{E_1(t)}{E_2(t)},$$

as four key feature sequences, whereing each feature sequence is normalized using a zero-mean method, and dynamic time-warped is used to measure the distance.

2. The in-air gesture control method based on visible light signals according to claim 1, characterized in that, the emitted light signals use a line-by-line refresh scheme to generate spatial resolution information out of the perception range of the human eye.

3. The in-air gesture control method based on visible light signals according to claim 1, characterized in that, the analysis comprises: after preprocessing and segmenting the reflected signal, respectively selecting and extracting the gesture features, finally, gestures are obtained by classification.

4. The in-air gesture control method based on visible light signals according to claim 1, wherein the emitted light signals are generated by the display device switching two adjacent complementary frames, and the line-by-line refresh scheme generates spatial resolution information out of the perception range of the human eye; when two complementary frames of n lines are switched continuously, the display device generates a high-frequency light signal of $$\frac{n * f_s}{2},$$

where: $f_s$ represents the refresh rate of the display device, then the light signal emitted by the display device has two frequency components:

$$\frac{n * f_s}{2} \text{ Hz and } \frac{f_s}{2} \text{ Hz,}$$

and the complementary block is on one side of the light sensor; in order to hide a complementary frame into the content of the display device, it is necessary to convert the pixels that need to be modified, that is, the complementary block parts, from RGB color space to CIE 1931 one by one to XYZ color space, and then the original pixel is convert into two complementary pixels to form two complementary frames.

5. The in-air gesture control method based on visible light signals according to claim 4, wherein a color space conversion is: X=0.41R+0.36G+0.18B, Y=0.21R+0.72G+0.07B, Z=0.02R+0.12G+0.95B
where: X, Y, Z represent the three components of the XYZ color space, respectively, and R, G, B represent the three components of the RGB color space, respectively.

6. The in-air gesture control method based on visible light signals according to claim 4, wherein the complementary frame is obtained by the following method: the color value (R, G, B) of a pixel in the image is converted into (x, y, Y), and then color values $(x_1, y_1, Y_1)$, $(x_2, y_2, Y_2)$ of complementary pixels are solved; a solution process is equivalent to solving a linear programming problem:

$$\max \Delta Y = |Y_1 - Y_2|,$$

$$\text{s.t. } x_1 = x_2 = x, \, y_1 = y_2 = y, \, Y = \frac{Y_1 + Y_2}{2};$$

by establishing a lookup table containing intermediate calculation results, the computing overhead is reduced, that is, the intermediate result $Y_{max}$ is directly obtained through (x, y), and then $\Delta Y_{max} = \min(Y_{max} - Y, Y)$ is solved, and optimization problem is solved.

7. The in-air gesture control method based on visible light signals according to claims 1, wherein adding an edge smoothing mechanism, edges of complementary blocks are scattered to reduce influence of two-frame switching on visual effects.

8. An in-air gesture control system for implementing the in-air gesture control method based on visible light signals comprises: a frame processing unit at transmitter, a signal processing unit at receiver and a gesture recognition unit, wherein: frame processing unit at transmitter processes #e-current content into a pair of multi-line complementary frames according to the content displayed in the current frame of the screen, so that the visual effect before and after mixing the two frames is the same, and the frequency that breaks the screen refresh rate limit can be generated; the signal processing unit preprocess the light intensity data received by the light sensor to obtain the key frequency energy sequences; the gesture recognition unit selects the feature sequences and uses k-NearestNeighbor (kNN) to classify the gesture according to the key frequency energy sequences generated by the signal processing unit at receiver to obtain the gesture recognition result;

further, XYZ is converted into two dimensions, including chromaticity and luminance:

$$x = \frac{X}{X + Y + Z}, \, y = \frac{Y}{X + Y + Z}, \, Y = Y,$$

where: (x, y) represents chromaticity and Y represents luminance.

9. The in-air gesture control system according to claim 8, wherein a reflected signal is collected at a sampling rate of 250 Hz.

* * * * *